Dec. 7, 1954 J. B. GUDIKUNST 2,696,313
WAGON SELF-UNLOADER
Filed Nov. 4, 1952

INVENTOR.
James B. Gudikunst
Richard E. Babcock Jr.
Attorney

United States Patent Office 2,696,313
Patented Dec. 7, 1954

2,696,313

WAGON SELF-UNLOADER

James B. Gudikunst, Ephrata, Pa., assignor to The Sperry Corporation, New Holland, Pa., a corporation of Delaware Application November 4, 1952, Serial No. 318,639

6 Claims. (Cl. 214—82)

This invention relates to a wagon unloader of the class in which a load ejector is rigidly connected to one of a pair of slides or carriages, both of which are normally movable only in one direction along a track toward the discharge end of the wagon box or body, power actuating means being operatively disposed to alternately force apart and draw toward each other said carriages, thus causing a step by step advance of the carriages and load ejector toward the discharge end of the box.

It is a primary object of the invention to provide a novel actuating linkage between such a power actuating means and the respective carriages which permits application of actuating force to the load ejector with a mechanical advantage which is at a maximum at the beginning of each discharge stroke or movement of the ejector, when maximum opposition to its movement is encountered due to the inertia and binding tendencies of the wagon box contents.

With the foregoing in view, my invention embodies the concept of connecting the said carriages by a toggle linkage, and employing the power actuating means to alternately deflect and return the knee of the toggle linkage to thus alternately spread apart and draw toward each other the said carriages.

In its preferred embodiment, the invention contemplates the provision of a pair of symetrically disposed toggle linkages connecting the said carriages, an expansible and contractible power actuated means being connected between the knees of said linkages, whereby its expansion and contraction may alternately spread apart and draw together said carriages.

In accordance with an important feature of the invention the two linkages are so spaced relative to each other that at the time the links of each are at their nearest approach to alignment, with their respective carriages at substantially their maximum distance apart, a hydraulic jack constituting the power actuating means connected between the knees of the linkages is contracted to substantially its fullest extent. Thus the expansion stroke of the jack spreads apart the knees of the linkages and draws together the carriages with a mechanical advantage which is greatest at the beginning of the expansion stroke when the two portions or links of each linkage are most nearly in alignment.

Figure 1:
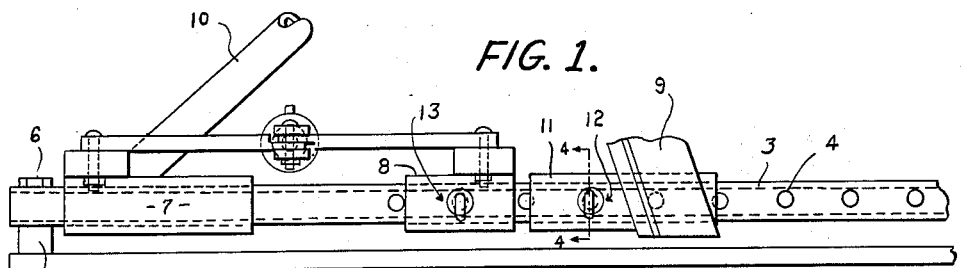
Figure 2:
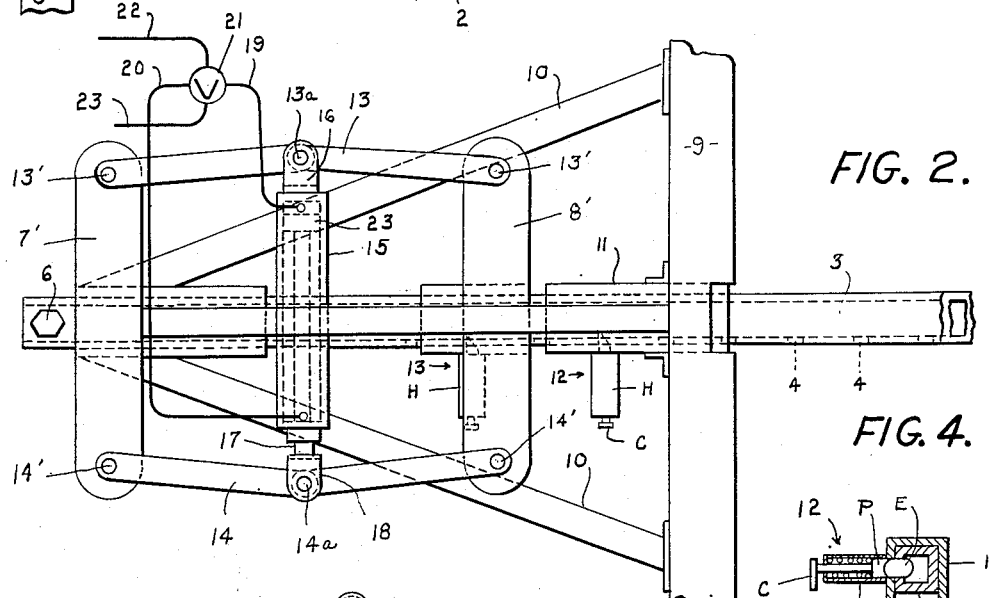
Figure 4:
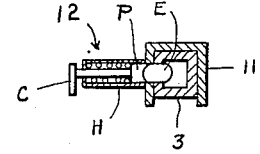
Figure 3:
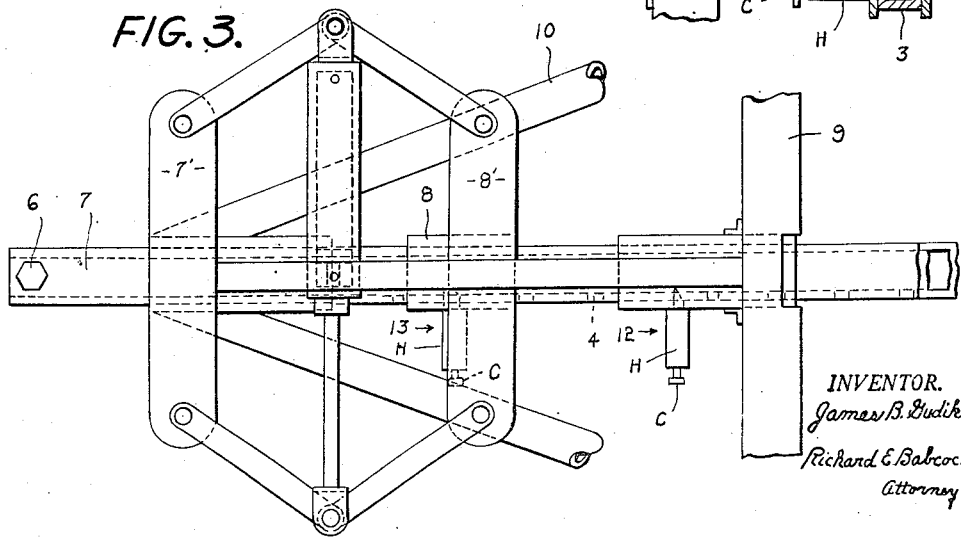

The best mode presently contemplated by me for carrying out my invention is illustrated in the accompanying drawing in which:

Figure 1 illustrates a longitudinal section through the bottom of a wagon box having my invention applied thereto, portions of the load ejector and its connection to the rearmost carriage being shown fragmentarily;

Figure 2, a plan view of the wagon unloading mechanism shown in Figure 1, including a diagrammatic representation of the control valve and supply lines of a suitable hydraulic jack, the jack being shown in its fully contracted position;

Figure 3, a view similar to Figure 2, but omitting the diagrammatic illustration of the hydraulic system, showing the positions assumed by the several parts when the jack is in its fully expanded position; and Figure 4, a cross-section on the line 4—4 of Figure 1, looking in the direction of the arrows, and showing the details of construction of the holding pawls such as employed in conjunction with each of the carriages to cooperate with the guide track and prevent retrogressive movement of the carriages.

Referring now in detail to the accompanying drawings, the reference character 2 in Figure 1 designates the bottom of a usual farm wagon which, it will be understood also includes opposed parallel sides for confining the wagon contents, though such sides, being purely conventional are not illustrated in the drawing. Such a wagon may be of the usual type which is adapted to be hitched to a farm tractor to be drawn forwardly thereby.

Fixedly supported above the wagon bottom or floor 2 is a guide track or rail 3 which is provided with a series of uniformly spaced pawl receiving recesses 4, whereby it may function in the manner of a rack bar, as hereinafter described. In the embodiment illustrated, the guide track is supported at its opposite ends on spacers 5. Bolts 6 extending through the track 4, spacers 5, and floor 2 serve to rigidly maintain the track 3 in fixed position.

Guided along the track 3 for movement lengthwise of the wagon box are carriages or slides 7 and 8 respectively, both of which are shown as downwardly opening channel members slideable along the track 3.

A load ejector or movable end gate 9 disposed for movement along the track 3 in advance of both carriages 7 and 8 is rigidly connected to the rearmost carriage 7 for movement therewith by suitable means in the form of rigid struts 10.

Although the load ejector 9 is fragmentarily illustrated in the drawing, it will be appreciated that in accordance with usual practice such load ejector 9 is dimensioned to extend completely across the wagon body between its sides and will of course sufficiently clear both the sides and the bottom of the wagon box to be freely movable lengthwise of the wagon box.

If desired, a slide 11 affixed to the lower edge of the ejector 9 for movement along track 3 in advance of both carriages 7 and 8 may supplement the action of the struts 10 in supporting and guiding the load ejector 9 along the track 3. The slide 11, being rigidly connected to the carriage 7 through the load ejector 9 and struts 10, in effect constitutes a forward extension or part of the carriage 7, but is necessarily spaced forwardly of the carriage 7 to permit relative operative movement of the carriage 8 between it and carriage 7.

Operatively associated with the carriages 7 and 8 are means generally designated 12 and 13 respectively, for permitting advance movement of said carriages along the track 3, but normally operating to prevent return movement of said carriages along the track. Although the means 13 is mounted directly on its associated slide or carriage 8, the means 12 in the present embodiment is carried by the slide 11 which, as above mentioned, is fixed to carriage 7 and in effect constitutes a forward extension of said carriage 7. However, it is merely a matter of choice whether the means 12 be carried by the carriage 7 or by the slide 11 or load ejector 9, inasmuch as these parts all move together as a unit.

The return movement preventing means 12 and 13 may be of identical construction similar to that illustrated in Figure 12, in which the means 12 comprises a spring loaded plunger type pawl P slidably disposed in housing H for projection into the recesses 4 to retain its respective carriage against return movement, but having inclined or cammed ends E adapted to automatically ride out of the recesses 4 and permit advance movement of the carriage.

In order to facilitate return of the carriages 7 and 8 to their starting positions after same have advanced through a complete discharge cycle, the pawls P may be formed of round cross-section and rotatable in their respective housings H whereby through manual actuation of their respective control handles C said pawls may be rotated through 180° to reverse the direction of operation of their cammed ends E.

In order to provide a suitable power multiplying means for alternately spreading apart and drawing toward each other the carriages 7 and 8 there are provided the toggle linkages 13 and 14 respectively. The opposite ends or extremities of the toggle linkage 13, and also the extremities of the toggle linkage 14, are pivotally connected as at 13'—13' and 14'—14' to cross heads 7' and 8' respectively fixed on and constituting part of the carriages 7 and 8.

An expansible and contractible power actuated means in the form of a hydraulic jack of the double acting type is connected between the knees 13a and 14a of the respective toggle linkages to either draw such knees together or spread them apart transversely to the direction of the movement of the load ejector 9. In the arrangement shown, the cylinder 15 of the jack is provided at its closed end with a clevis 16 providing a pivotal connection with the knee 13a, and the piston rod 17 is similarly provided with a clevis 18 establishing a pivotal connection with the knee 14a.

As illustrated diagrammatically in Figure 2, fluid lines or conduits 19 and 20 respectively establish communication between the opposite ends of the interior of the cylinder 15 and a reversing valve 21. Fluid under pressure from any suitable source (preferably consisting of the hydraulic system on the same tractor which is employed to tow the wagon with which my invention is associated) may be supplied to one end of the cylinder 15 while being simultaneously withdrawn from the other end thereof, the reversing valve 21 being controllable in usual manner to reverse such fluid flow at each end of the piston stroke to cause a reciprocating action of the piston 23 within the cylinder 15.

By reference to Figure 2 it will be seen that the hydraulic jack and the toggle linkages 13 and 14 are so arranged that the individual links of the respective linkages 13 and 14 most nearly approach relative alignment when the jack is in its fully contracted position as in Figure 2. At this time the carriages 7 and 8 are separated to the fullest extent possible, and on the expansion stroke of the piston 23, spreading of the toggle knees 13a and 14a respectively will function to advance the carriage 7, while the carriage 8 is anchored against return movement by its pawl mechanism 13 in interengagement with the track or rack bar 3. In accordance with well known mechanical principles the mechanical advantage attainable through the toggle linkages 13 and 14 will be at its greatest at the inception of this expansion stroke. Also, throughout the expansion stroke the fluid pressure within the cylinder 15 will be exerted against the full area of the piston 23 on the side thereof opposite from the piston rod 17, it being noted that the presence of the piston rod 17 serves to reduce the effective area of its respective side of the piston 23.

Such ability of the power actuating means to exert the greatest mechanical advantage at the inception of the advance stroke of the carriage 7 and load ejector 9 is of outstanding advantage in unloading or discharging loads of ensilage and the like material which tends to compress in and bind against the wagon body and can be broken loose only through the exertion of a very considerable force on the load ejector 9.

To briefly summarize the operation of the invention, when it is desired to discharge a load of material from the wagon body, the hydraulic system of the tractor towing the wagon is actuated in usual manner to circulate fluid under pressure through the conduits 22, 23, and reversing valve 21. The reversing valve is actuated manually or automatically to cause a reciprocating motion of the piston 23 within its cylinder 15, thereby alternately forcing apart and drawing toward each other the knees 12a and 14a of the toggle linkages. As the knees 13a, 14a are spread apart from the positions of Figure 2 to the position shown in Figure 3, it will be seen that the carriages 7 and 8 will be drawn toward each other. However, inasmuch as the pawl means 13 of carriage 8 cooperates with the track 3 to prevent return movement of carriage 8, said carriage serves as an anchor and thus the carriage 7 and load ejector 9 are advanced a step, during the course of which the pawl P of the holding means 12 is automatically withdrawn from the one hole 4 at the beginning of the stroke and automatically inserted into the next succeeding hole 4 in track 3 at the end of its advance stroke.

Subsequent contraction of the hydraulic means will then tend to push the carriage 8 forwardly one step to have its holding pawl move to and reengage in the next successive hole 4, while the holding means 12 is operative to prevent return movement of load ejector 9 or either of its slides 7 and 11.

Continued expansion and contraction of the jack will produce a step by step advance of the carriages 7 and 8 and the load ejector 9 toward the discharge end of the wagon (to the right in the drawing) until the wagon contents is completely discharged through the rear end of the wagon.

Following complete discharge of the wagon contents when it is desired to return the ejector 9 to its starting position the control handles C of the respective holding means 12 and 13 may both be rotated through 180° from the positions of Figure 1 to reverse the action of the respective holding means 12 and 13, whereby reciprocation of the hydraulic jack will cause a step by step return movement of the carriages 7 and 8 in a manner just the reverse of that above described.

In this application I have shown and described but a single embodiment of my invention simply by way of illustrating the preferred mode of carrying out my invention. However, I recognize that the invention is capable of other and different embodiments and that its several details may be modified in various ways. Accordingly, the drawing and description herein are to be considered as merely illustrative in nature and not as exclusive.

Having thus described my invention, I claim:

1. A wagon unloader comprising a guide track, a pair of carriages guided for movement along said track, said track and each of said carriages being provided with cooperating means permitting advance of both said carriages and normally preventing return movement thereof along the track, a slide mounted for movement along said track in advance of the carriages, a load ejector carried by said slide in advance of the carriages, means operatively connecting said load ejector to the rearmost of said carriages for movement therewith, and a pair of toggle linkages each pivotally connected at its extremities to said respective carriages, in combination with an expansible and contractible means operatively connected to the knees of said respective toggle linkages to alternately spread apart and contract same, thus causing alternate spreading and drawing toward each other of the carriages with resultant step by step advance of the carriages and load ejector along the track.

2. The combination defined in claim 1 in which the guide track comprises a rack bar and the carriages have pawl mechanisms associated therewith for cooperation with said rack bar to permit advance of both said carriages and to prevent return movement thereof along said rack bar.

3. The combination of claim 2 in which the said means for preventing return movement of the rearmost carriage is carried by the said slide.

4. A wagon unloader comprising a guide track, a pair of carriages guided for movement along said track, said track and each of said carriages being provided with cooperating means permitting advance of both said carriages and normally preventing return movement thereof along the track, a load ejector positioned in advance of both carriages, means operatively connecting said load ejector to the rearmost of said carriages for movement therewith, and a pair of toggle linkages each pivotally connected at its extremities to said respective carriages, in combination with an expansible and contractible means operatively connected to the knees of said respective toggle linkages to alternately spread apart and draw same toward each other, with resulting step by step advance of the carriages and load ejector along the track.

5. The combination defined in claim 4, in which the expansible and contractible means comprises a double acting hydraulic jack having a cylinder pivotally connected to the knee of one said toggle linkage and a piston pivotally associated with the knee of the other said toggle linkage.

6. A wagon unloader comprising a guide track, a pair of carriages guided for movement along said track, said track and each of said carriages being provided with cooperating means permitting advance of both said carriages and normally preventing return movement thereof along the track, a load ejector disposed in advance of said carriages, means operatively connecting said load ejector to the rearmost of said carriages for movement therewith, and a pair of toggle linkages each pivotally connected at its extremities to said respective carriages, in combination with an expansible and contractible means operatively connected to the knees of said respective toggle linkages to alternately spread apart and draw same toward each other, the positions of said linkages being so related to the stroke of said expansible and contractible means that in the fully contracted condition of the latter, the individual links of each said linkage are at their nearest approach to relative alignment, whereupon a subsequent expansion of said means will urge said links out of alignment and thereby draw together said carriages with a mechanical advantage which is at its maximum at the beginning of the said expansion stroke.

References Cited in the file of this patent

UNITED STATES PATENTS

| Number | Name | Date |
|---|---|---|
| 1,946,452 | Bridges | Feb. 6, 1934 |
| 1,962,228 | Abramson et al. | June 12, 1934 |
| 2,258,988 | Le Laurin | Oct. 14, 1941 |
| 2,318,886 | Paiement | May 11, 1943 |
| 2,365,771 | Olson | Dec. 26, 1944 |
| 2,599,741 | Bishman | June 10, 1952 |
| 2,621,021 | Dahl et al. | Dec. 9, 1952 |